United States Patent [19]

Jones et al.

[11] Patent Number: 4,511,466
[45] Date of Patent: Apr. 16, 1985

[54] CHAFFER SLAT

[75] Inventors: Dennis J. Jones, West Brooklyn; Gary L. Kunz, Mendota, both of Ill.

[73] Assignee: Hart-Carter Company, Mendota, Ill.

[21] Appl. No.: 561,300

[22] Filed: Dec. 14, 1983

[51] Int. Cl.³ .......................... A01F 12/44; B07B 1/34
[52] U.S. Cl. ...................................... 209/395; 130/24; 209/394
[58] Field of Search .................. 209/394, 395; 130/24

[56] References Cited

U.S. PATENT DOCUMENTS

| | | | |
|---|---|---|---|
| 682,670 | 9/1901 | Closz | 209/394 |
| 787,867 | 4/1905 | Van Wye | 209/394 |
| 909,757 | 1/1909 | Closz | 209/394 |
| 925,623 | 6/1909 | Closz | 209/394 |
| 2,253,296 | 8/1941 | Holtzman | 209/394 |
| 2,335,416 | 11/1943 | Holtzman | 209/394 |
| 2,413,382 | 12/1943 | Sargent et al. | 209/394 |
| 3,334,744 | 8/1967 | James et al. | 209/394 |
| 3,385,438 | 5/1968 | Fisher | 209/394 |

Primary Examiner—Paul J. Hirsch
Attorney, Agent, or Firm—Charles W. Rummler

[57] ABSTRACT

An improved slat for harvester sieves and chaffers comprising a blade of single thickness from the finger tips to the bottom edge of the angularly disposed air blast baffle and wherein the blade is shaped at the upper end of the baffle to provide a longitudinal channel of semi-circular section adapted to receive and fit the conventional slat support rod, the opening of the channel having longitudinally spaced indentations to effect a snap-in reception of the slat support rod.

2 Claims, 6 Drawing Figures

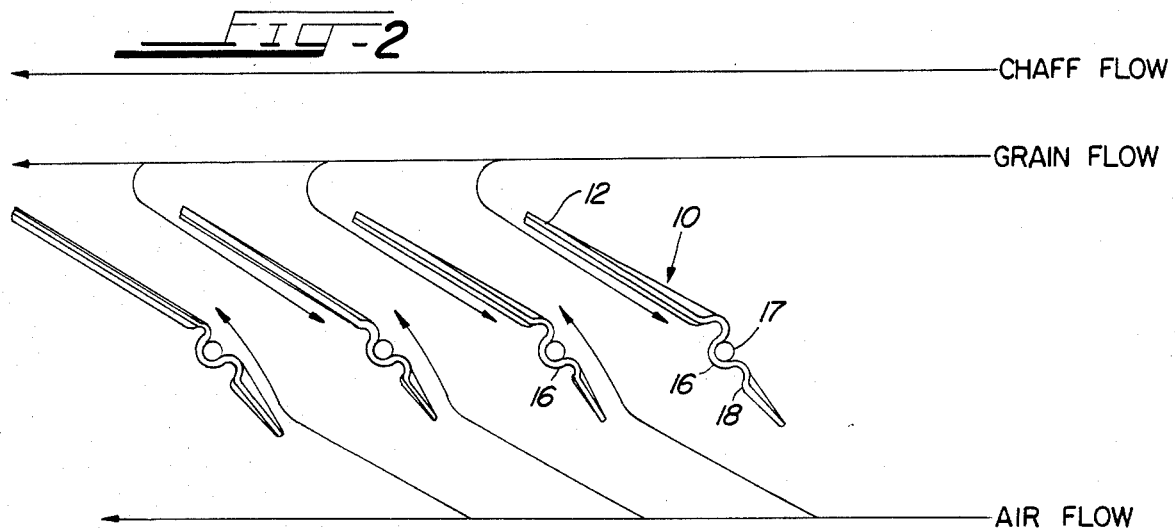
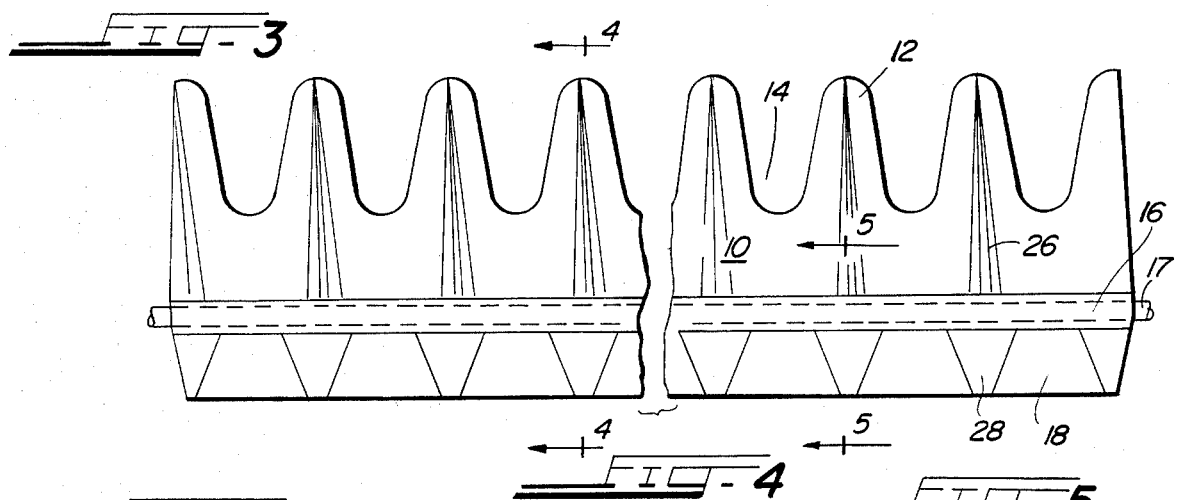
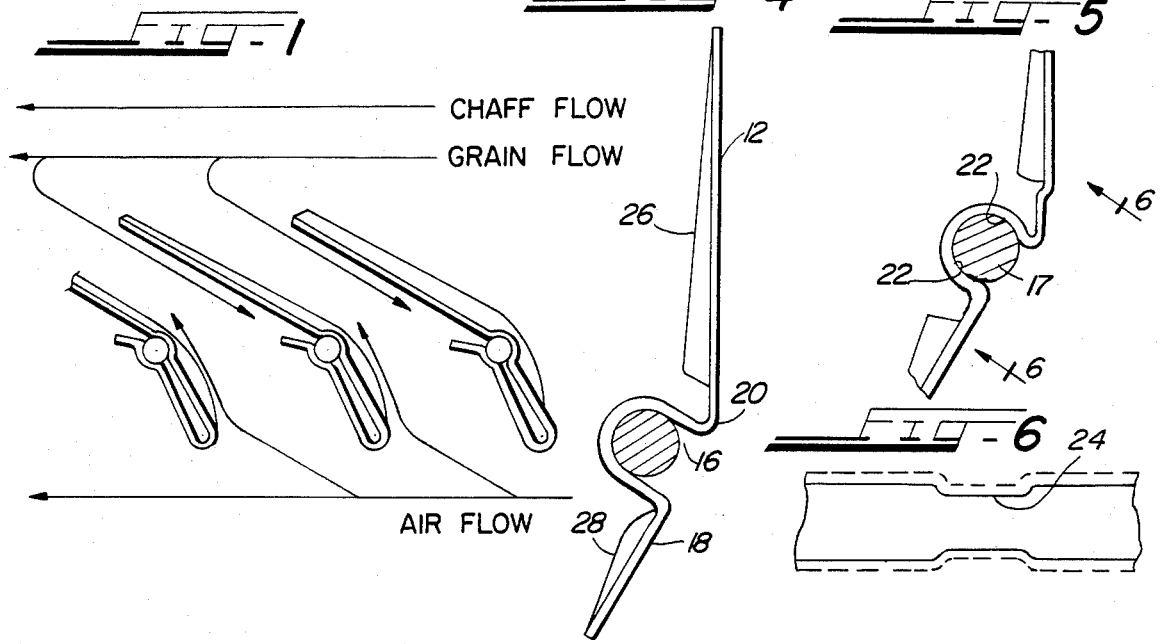

CHAFFER SLAT

BACKGROUND OF THE INVENTION

Conventional chaffer slats have been made from a relatively long sheet metal strip punched along the top edge of the sheet to form spaced teeth of the sieve portion of the slat and the bottom portion of the metal strip below the teeth is folded upon itself and then its edge margin is inwardly rolled to form a passage for the slat supporting rod. This folded portion is then bent backwardly to bear the rolled edge against the back side of the slat to form the air blast baffle. The rolled edge of this doubled portion of this slat serves to catch and interrupt the downward flow of the grain so that considerable amounts of the separated grain are trapped or deflected into the upwardly flowing air stream and decreases the efficiency of the chaffer operation. A conventional chaffer and sieve construction employing slats of this kind is shown in U.S. Pat. No. 2,253,296, and it was the efforts to cure this problem, simplify manufacture and reduce production costs that resulted in the present invention.

SUMMARY OF THE INVENTION

The inventive concepts resulting in the present invention are intended to provide an improved slat for use in the sieves and chaffers of harvesting machines and particularly to provide a single vane type of slat of uniform thickness from the finger tips to the bottom edge of the angularly-disposed air blast baffle, the blade being shaped at the upper end of the baffle to provide a longitudinal channel of semi-circular section adapted to receive and fit the conventional slat support rod, the opening of the channel having longitudinally-spaced indentations to effect a snap-in reception of the slat support rod.

DESCRIPTION OF THE DRAWINGS

A specific embodiment of this invention is shown in the accompanying drawings, in which:

FIG. 1 is a diagrammatic view illustrating a conventional form of chaffer slat and the relationship of the slats to the air flow for cleaning the slats, the chaffs and grain flow and the path of the separated grain as it drops between the slats;

FIG. 2 is a similar diagrammatic view illustrating the improved slats of the present invention and the air, chaff and grain flow relations with the slats;

FIG. 3 is a front elevational view of a chaffer slat according to the present invention;

FIG. 4 is a sectional view of the same as taken on line 4—4 of FIG. 3;

FIG. 5 is a fragmentary sectional view as taken on line 5—5 of FIG. 3; and

FIG. 6 is a view showing the rod detent means as seen from line 6—6 of FIG. 5.

DESCRIPTION OF THE PREFERRED EMBODIMENT

FIG. 1 of the drawings illustrates the form of the conventional prior art slat which the present invention is intended to improve upon, both structurally and operationally as well as for cost of production. As shown in FIG. 1, the lower portion of the slat, or the air blast baffle area, is double upon itself to terminate with an outwardly projecting lip and between the lip and the slat body, there is formed a longitudinally extending channel adapted to firmly embrace the conventional slat supporting rod with a snap-on engagement. As illustrated, the grain flowing downwardly along the under side of the slat can catch in the opening between the lip and the slat body and build up to interrupt the normal upward air flow which functions to separate the chaff and grain as the mass travels over the chaffer.

FIGS. 2 and 3 illustrate the improved chaffer slat of the herein disclosed invention, FIG. 2 showing how the air is free to flow upwardly against the downward flow of the separated grain whereby the lightweight chaff can be efficiently lifted from the grain and discharged over the rear end of the chaffer.

As shown in FIG. 3, the slat 10 is a sheet metal strip the upper half of which is formed to provide a lengthwise series of uniformly spaced fingers 12 between which sieve or mesh openings 14 are formed for passage of the grain to a pan, not shown, extending the length and width of the chaffer. FIG. 3 also indicates the longitudinal groove or channel 16 formed in the upper side of the slat and in which the supporting rod 17 is received.

As shown in FIG. 4, the air blast baffle portion 18 of the slat is angled forwardly from the fingered portion of the slat at an angle of about 30° and the channel 16 for receiving the supporting rod 17 formed in the slat immediately below or at the point of angulation 20 so as to be substantially within the blast baffle 18. The channel 16 is semi-circular in section with substantially the same radius as a cross-section of the supporting rod and as shown in FIGS. 5 and 6, the channel walls 22 at the channel opening are provided with opposing embossments 24 at suitably spaced intervals along the length of the channel to effect snap-on engagement with the supporting rod when the slat is being mounted thereon.

Also, as shown the fingers 12 and the aligned areas of the blast baffle portion 18 of the slat are formed with reinforcing ribs 26 and 28. The rib 26 for each of the fingers 12 extends the length thereof and tapers from the finger tip and gradually widens to adjacent the channel 16. The rib 28 for the blast baffle portion 18 is of a generally triangular shape and tapers outwardly and inwardly from adjacent the channel 16 to the edge of the baffle, the widest and thickest part of the rib being close to the channel.

In general and as is conventional in the manufacture of harvester sieves and chaffers, the fingers 12 will be quite closely spaced and the open areas between the fingers will be at least the same as the area of the fingers. In that way the slats, which are disposed in somewhat overlapping relation in the chaffer construction, create a rather fine mesh sieve through which the grain is separated from the larger and more lighter-weight chaff which is carried away by the air flow that enters the chaffer from beneath the slats and is directed upwardly between the slats by the blast baffle 18 as shown in FIG. 2.

Although but one specific embodiment of this invention is herein shown and described, it will be understood that details of the construction shown may be altered or omitted without departing from the spirit of the invention as defined by the following claims.

We claim:

1. A harvester chaffer slat comprising a sheet metal blade having uniformly spaced fingers formed along its upper edge to provide open spaces between the fingers, the blade being bent rearwardly from the plane of its fingered portion in a manner as to form a forwardly and generally upwardly opening, semi-circular channel extending lengthwise of the blade and an angularly projecting air flow baffle portion extending downwardly from the channel and lying wholly within a plane intersecting the plane of said fingered portion, said channel being of a size to firmly receive a slat supporting rod leaving spaced apart the apexes of the channel opening.

2. A harvester chaffer slat comprising a sheet metal blade having uniformly spaced fingers formed along its upper edge to provide open spaces between the fingers, the blade being bent rearwardly from the plane of its fingered portion in a manner as to form a forwardly and generally upwardly opening, semi-circular channel extending lengthwise of the blade and an angularly projecting air flow baffle portion extending downwardly from the channel and lying wholly within a pole intersecting the plane of said fingered portion, said channel being of a size to firmly receive a slat supporting rod leaving spaced apart the apexes of the channel opening, and the opposing side walls of said channel having opposing detents formed therein at spaced intervals along said channel for snap-fit reception of the said slat supporting rod.

* * * * *